(12) United States Patent
Storisteanu

(10) Patent No.: US 7,451,396 B2
(45) Date of Patent: Nov. 11, 2008

(54) METHOD FOR SYNCHRONIZATION OF A LINE-ORIENTED TEXT DOCUMENT AND A STREAM-ORIENTED TEXT DOCUMENT

(75) Inventor: Adrian Storisteanu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 10/756,141

(22) Filed: Jan. 13, 2004

(65) Prior Publication Data

US 2005/0097434 A1 May 5, 2005

(30) Foreign Application Priority Data

Oct. 29, 2003 (CA) .................................... 2447361

(51) Int. Cl.
*G06F 17/00* (2006.01)
(52) U.S. Cl. ...................... 715/256; 715/255
(58) Field of Classification Search ................ 715/500, 715/200, 203, 221–225, 253, 255, 256; 345/744; 707/104.1, 100
See application file for complete search history.

(56) References Cited

U.S. PATENT DOCUMENTS 6,836,780 B1 * 12/2004 Opitz et al. ............... 707/104.1
2004/0162833 A1 * 8/2004 Jones et al. ................. 707/100

* cited by examiner

*Primary Examiner*—Stephen Hong
*Assistant Examiner*—Manglesh M Patel
(74) *Attorney, Agent, or Firm*—Duke W. Yee; Jeffrey S. LaBaw; LaRhonda Jefferson-Mills

(57) ABSTRACT

A method for synchronizing the contents of a line-oriented text document and a stream-oriented text document. The line-oriented text document has a sequence number area. The line-oriented text document listens for a change in the content of the stream-oriented text document and vice versa. When a change is detected in one document, listening in the other document is suspended and a complementary document change is implemented in the other document. Document adjustments resulting from such a complementary change are listened for separately, and echoed similarly into the original document.

19 Claims, 10 Drawing Sheets

METHOD FOR SYNCHRONIZATION OF A LINE-ORIENTED TEXT DOCUMENT AND A STREAM-ORIENTED TEXT DOCUMENT

FIELD OF THE INVENTION

The present invention relates to data processing systems, and more particularly to a method for synchronization of a line-oriented text document and a stream-oriented text document.

BACKGROUND OF THE INVENTION

Line-oriented text systems and applications operate using a system of records in which each line in a file or text document is a separate record. Typically, each line includes a text element of a fixed or maximum length containing the record information, and a series of fixed-length columns which include a non-text element(s) relating to record management, for example, sequence numbers. Line-oriented text systems are commonly found in legacy systems. Legacy systems or legacy applications are systems or applications implemented using languages, platforms, or techniques earlier than the current technology. Examples of legacy systems include the System/390® (S/390®) and AS/400® mainframes from IBM Corporation. Legacy applications often contain important data, logic or applications which need to be accessed by newer or current applications or systems. Thus, an important feature for new software products is the ability to interface with, or at least import data from and export data to, legacy applications.

Line-oriented text editors are one example of line-oriented text applications. Modern text editors such as Word™ and Wordperfect™ are stream-oriented applications in which text documents are generally less structured. Unlike line-oriented text documents where each line is a record having a number of fixed-length columns, a stream-oriented text document comprises a stream of characters.

It is often desirable to access line-oriented text documents using stream-oriented applications. However, many problems can arise when a line-oriented text editor is interfaced with a stream-oriented application. For example, many stream-oriented text applications typically cannot understand line-oriented text documents due to the structured format of those documents. Further, most stream-oriented text applications cannot implement sequence numbers or handle adjustments to sequence numbers and/or the text records that may arise from edit operations.

Additional record-structure formatting issues may result from differences between the character encoding used by the line-oriented documents on the legacy system (e.g. Extended Binary Coded Decimal Interchange Code (EBCDIC)) and the character encoding used by the new software platform (e.g. Unicode) processing these documents.

In view of these shortcomings, there exists a need for a method for synchronization of a line-oriented text document and a stream-oriented text document.

SUMMARY OF THE INVENTION

The present invention provides a method for synchronizing the contents of a line-oriented text document and a corresponding stream-oriented text document. According to one aspect, the method allows a stream-oriented text application to interface with a line-oriented text application in a manner that supports the maintenance of a sequence number area and the text-record length features associated with the line-oriented text document.

In accordance with one aspect of the present invention, there is provided for a data processing system, a method for synchronizing the contents of a line-oriented document and a corresponding stream-oriented document, the line-oriented document having a sequence number area, the data processing system being operably coupled to memory, the method comprising the steps of: listening for a change in the content of the line-oriented document; listening for a change in the content of the stream-oriented document; when a document change is detected in the line-oriented document, suspending listening for changes in the stream-oriented document and implementing a complementary document change in the stream-oriented document; and when a document change is detected in the stream-oriented document, suspending listening for changes in the line-oriented document and implementing a complementary document change in the line-oriented document.

In one example embodiment, the method also comprises: when a document change is detected in the stream-oriented document, listening for a document adjustment in the line-oriented document; and when a document adjustment is detected in the line-oriented document, after the step of implementing a complementary document change in the line-oriented document, suspending listening for changes in the stream-oriented document and implementing a complementary document adjustment in the stream-oriented document.

In accordance with another aspect of the present invention, there is provided a computer program product having a computer readable medium tangibly embodying code for directing a data processing system to synchronize the contents of a line-oriented document and a corresponding stream-oriented document, the line-oriented document having a sequence number area, the data processing system being operably coupled to memory, the computer program product comprising: code for listening for a change in the content of the line-oriented document; code for listening for a change in the content of the stream-oriented document; code responsive to a document change detected in the line-oriented document for suspending listening for changes in the stream-oriented document and implementing a complementary document change in the stream-oriented document; and code responsive to a document change detected in the stream-oriented document for suspending listening for changes in the line-oriented document and implementing a complementary document change in the line-oriented document.

In one example embodiment, the computer program product also comprises: code responsive to a document change detected in the stream-oriented document for listening for a document adjustment in the line-oriented document; and code responsive to a document adjustment detected in the line-oriented document for, after implementing a complementary document change in the line-oriented document, suspending listening for changes in the stream-oriented document and implementing a complementary document adjustment in the stream-oriented document.

In accordance with a further aspect of the present invention, there is provided a data processing system for synchronizing the contents of a line-oriented document and a corresponding stream-oriented document, the line-oriented document having a sequence number area, the data processing system being operably coupled to memory, the data processing system comprising a document synchronization adapter, including: a module for detecting a change in the content of the line-oriented document; a module for detecting a change in the content of the stream-oriented document; a module responsive to a document change detected in the line-oriented document for suspending detecting changes in the stream-oriented document and implementing a complementary document change in the stream-oriented document; and a module responsive to a document change detected in the stream-oriented document for suspending detecting changes in the line-oriented document and implementing a complementary document change in the line-oriented document.

In one example embodiment, the data processing system also comprises: a module responsive to a document change detected in the stream-oriented document for detecting a document adjustment in the line-oriented document; and a module responsive to a document adjustment detected in the line-oriented document for, after implementing a complementary document change in the line-oriented document, suspending detecting changes in the stream-oriented document and implementing a complementary document adjustment in the stream-oriented document.

In accordance with yet a further aspect of the present invention, there is provided a computer data signal embodied in a carrier wave for directing a data processing system to synchronize the contents of a line-oriented document and a corresponding stream-oriented document, the line-oriented document having a sequence number area, the data processing system being operably coupled to memory, the computer data signal comprising: a component in the computer data signal for detecting a change in the content of the line-oriented document; a component in the computer data signal for detecting a change in the content of the stream-oriented document; when a document change is detected in the line-oriented document, a component in the computer data signal for suspending detecting changes in the stream-oriented document and a component in the computer data signal for implementing a complementary document change in the stream-oriented document; and when a document change is detected in the stream-oriented document, a component in the computer data signal for suspending detecting changes in the line-oriented document and a component in the computer data signal for implementing a complementary document change in the line-oriented document.

In one example embodiment, the computer data signal also comprises: when a document change is detected in the stream-oriented document, a component in the computer data signal for detecting a document adjustment in the line-oriented document; and when a document adjustment is detected in the line-oriented document, after implementing a complementary document change in the line-oriented document, a component in the computer data signal for suspending detecting changes in the stream-oriented document, and a component in the computer data signal for implementing a complementary document adjustment in the stream-oriented document.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Similar references are used in different figures to denote similar components.

DETAILED DESCRIPTION OF THE DRAWINGS

The following detailed description of specific embodiments of the present invention does not limit the implementation of the invention to any particular computer programming language. The present invention may be implemented in any computer programming language where the operating system provides the facilities to support the requirements of the present invention. In one embodiment, the present invention is implemented, at least partly, in the Java computer programming language. Any limitations presented herein as a result of a particular type of operating system or computer programming language are not intended as limitations of the present invention.

Figure 1:
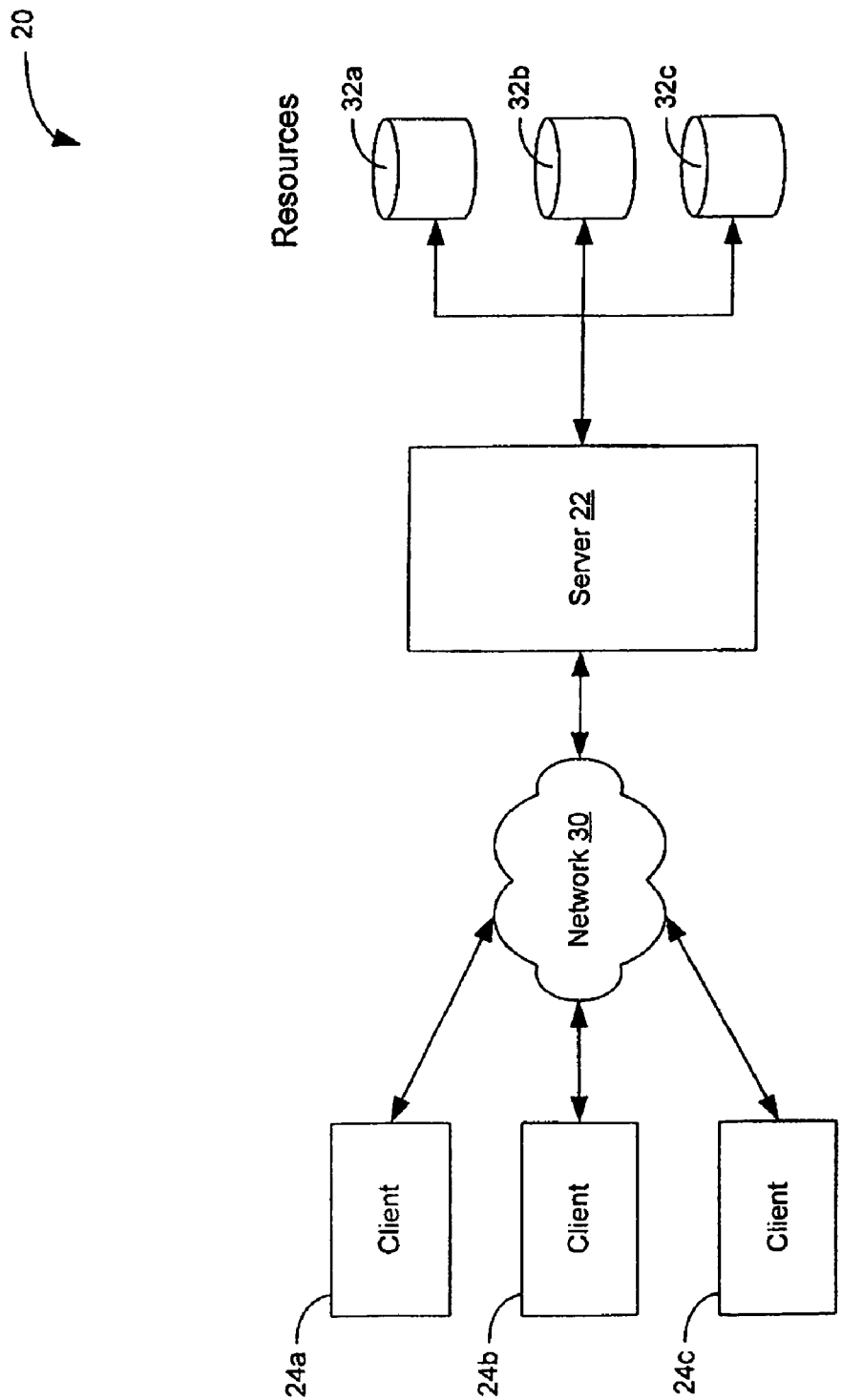
FIG. 1 is a schematic diagram of a computer system suitable for practicing the present invention.

Reference is first made to FIG. 1, which shows a computer system 20 upon which the present invention may be implemented. The computer system 20 includes a server 22 and clients 24, shown individually as references 24a, 24b, 24c, and which are interconnected by a network 30. The server 22 may be modeled as a number of server components including an application or business logic server, graphical user interface server, and a database server or resource manager. The clients 24 may comprise computers, data processing systems, workstations, handheld portable information devices, or computer networks. The clients 24 may be the same or different. In one embodiment, the network 30 is the Internet or World Wide Web (WWW). In such cases, the client computers 24 are equipped with appropriate web browser programs such as Internet Explorer™ software from Microsoft Corporation or Netscape's Navigator™, and the server 22 is equipped with appropriate hyper text transfer protocol (HTTP) server software, such as the IBM WebSphere® product.

The computer system 20 further includes resources 32 connected to the network 30. The resources 32, shown individually as 32a, 32b, 32c, may comprise storage media, mainframes such as the IBM S/390 or AS/400 platforms, databases, for example, a relational database such as the IBM DB2® product, a set of XML (eXtensible Markup Language) documents, a directory service such as a LDAP (Lightweight Directory Access Protocol) server, and backend systems. The interface between the server 22 and the resources 32 may comprise a local area network, Internet, or a proprietary interface. The resources 32 may be accessed by the server 22 and the clients 24. Any of the server 22, the clients 24, and the resources 32 may be located remotely from one another or may share a location. The configuration of the computer system 20 is not intended as a limitation of the present invention, as will be understood by those of ordinary skill in the art from a review of the following detailed description. For example, in other embodiments the network 30 may comprise a wireless link, a telephone communication, radio communication, or computer network (e.g. a Local Area Network (LAN) or a Wide Area Network (WAN)).

Figure 2:
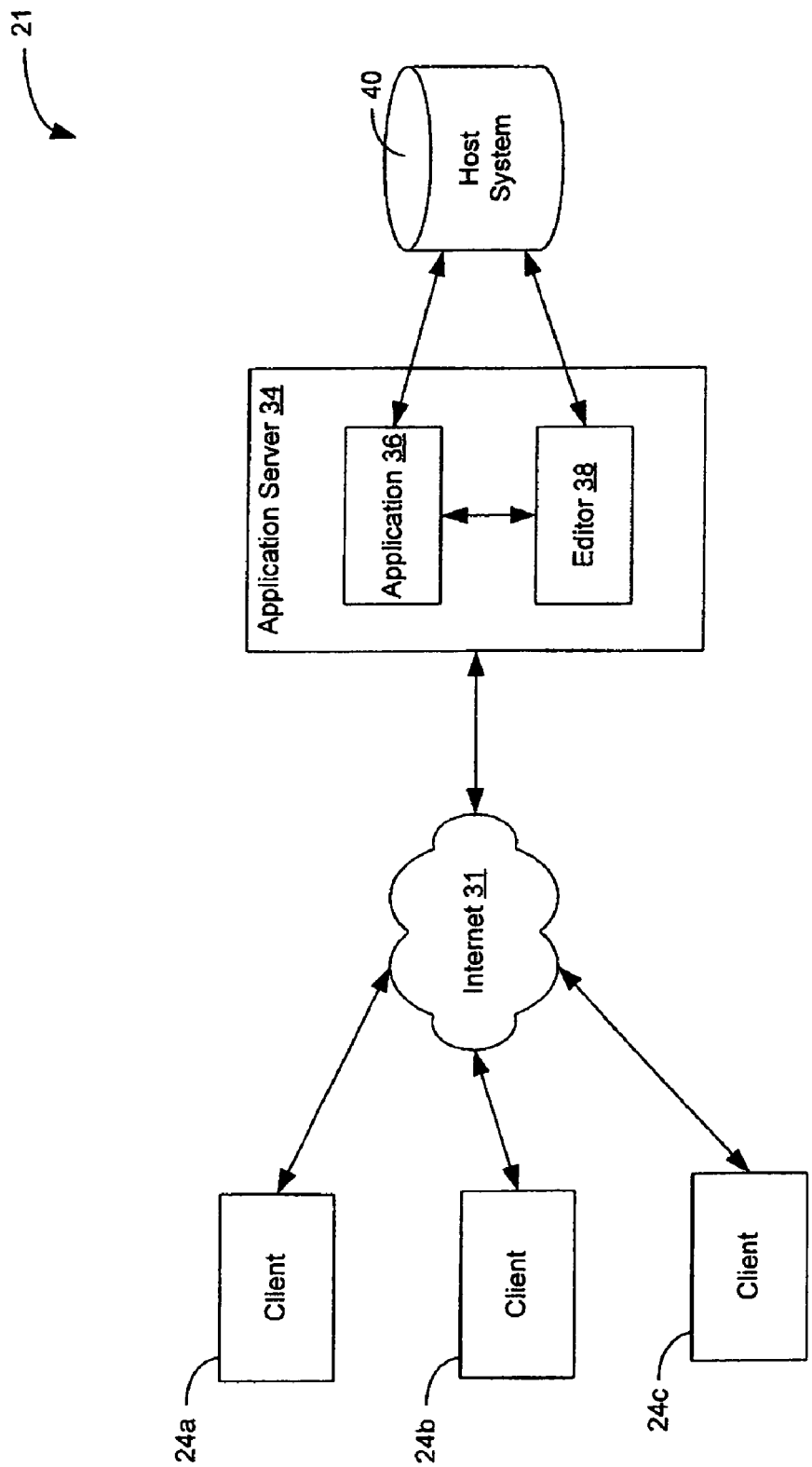
FIG. 2 is a schematic diagram of an exemplary computer system suitable for utilizing the present invention.

Reference is now made to FIG. 2, which shows an example embodiment of a computer system 21 upon which the present invention may be implemented. The computer system 21 is similar to the computer system 20 shown in FIG. 1, and includes a server 34, and a host system 40 such as an S/390 or AS/400 mainframe, and the clients 24 shown individually as references 24a, 24b, 24c. The clients 24 connect to the server 34 via the Internet or WWW 31. The server 34 implements a web application server compliant with the Java Version 2 Enterprise Edition (J2EE) platform such as the IBM WebSphere product. A user interface (not shown) is presented to the clients 24 using JavaServer Pages (JSPs) and servlets. Business logic is implemented on the server 34 using Enterprise JavaBean components (EJB) for the object layer. A stream-oriented application 36 and a line-oriented text editor (editor) 38 run on the server 34. The application 36 and editor 38 communicate with each other, and have access to the host system 40. In some embodiments, the application 36 and the editor 38 may comprise separate programs residing on the server 34. In other embodiments, the editor 38 is integrated in the application 36. In one example embodiment, the application 36 comprises a workstation development toolkit such as the WebSphere Development Studio Client for iSeries® and the editor 38 is the LPEX (Live Parsing Extensible Editor) editor which is integrated therein. In this embodiment, the client 24 is a workstation running a Windows™ family operating system such as WindowsNT™ from Microsoft™. Those skilled in the art will recognize that many computing platforms, operating systems, and enterprise application server suites may be used with the present invention without departing from the scope of the invention.

Figure 3:
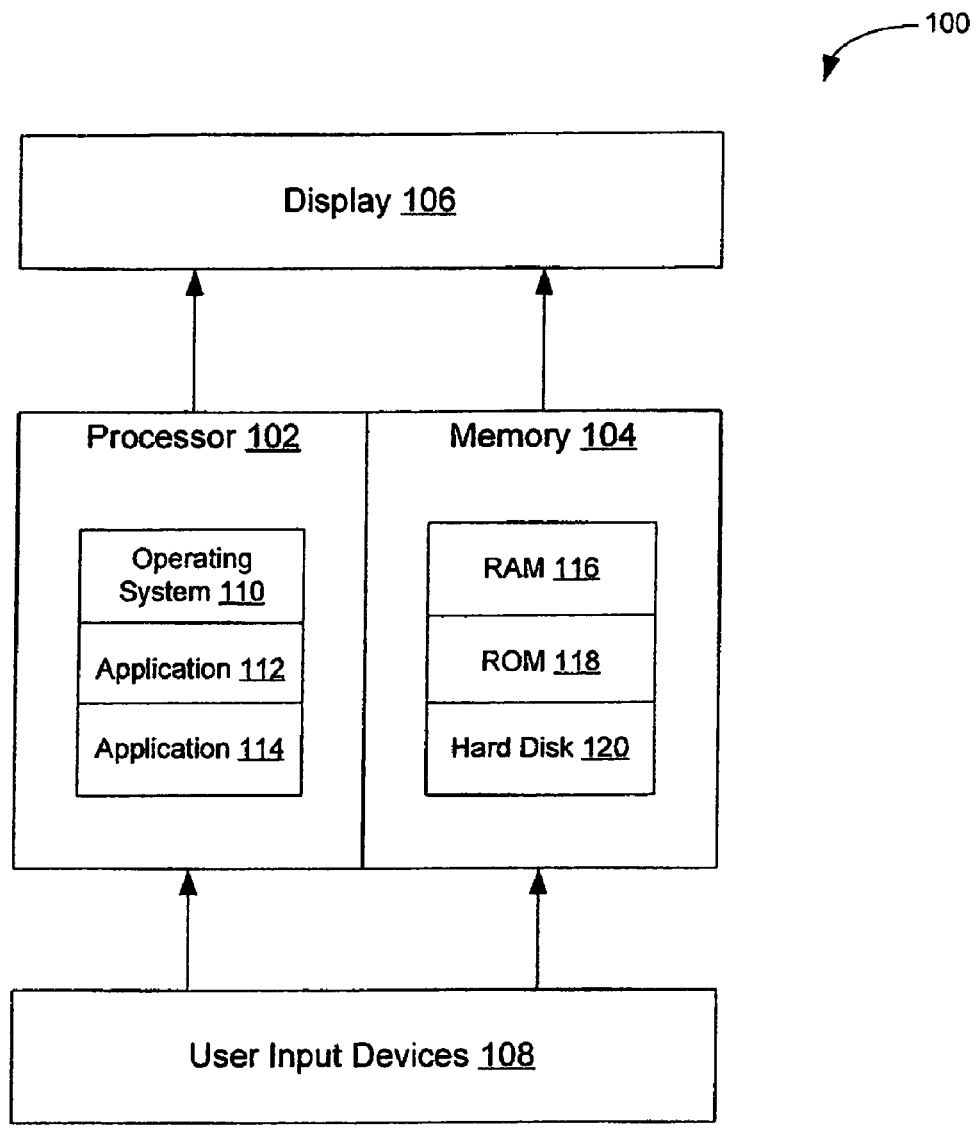
FIG. 3 is a block diagram of a data processing for the computer system of FIG. 1.

Reference is now made to FIG. 3, which shows a data processing system 100 for the computer system 20 (FIG. 1) or 21 (FIG. 2). The data processing system 100 includes a processor 102, memory 104, a display 106, and user input devices 108 such as a keyboard and a pointing device (e.g. mouse), and a communication interface (not shown) for communicating with the network 30 (FIG. 1) or 31 (FIG. 2). An operating system 110 and application programs 112, 114 run on the processor 102. The memory 104 includes random access memory ("RAM") 116, read only memory ("ROM") 118, and a hard disk 120. The data processing system 100 may comprise a client or a server.

Figure 4:
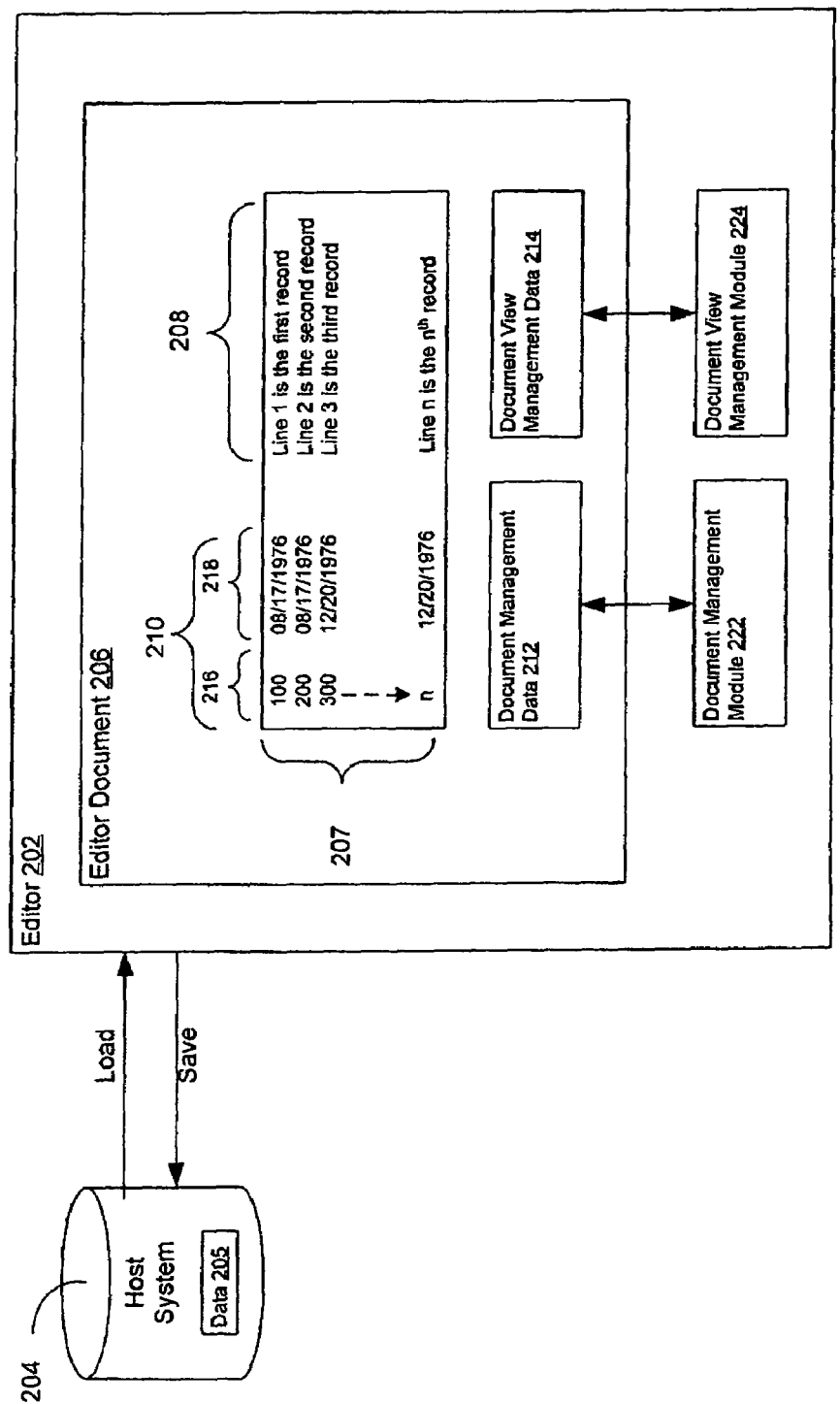
FIG. 4 is a schematic diagram of a line-oriented text editor.

Reference is now made to FIG. 4, which shows a line-oriented text editor (editor) 202 implemented in accordance with an aspect of the present invention. The editor 202 includes a document management module 222 and a document view management module 224. The document management module 222 handles the text-editing operations of the editor 202. The document view management module 224 maintains synchronization between different edit views created for the same editor document 206 in the current user session. The editor 202 runs on the server 34 (FIG. 2) and is coupled to a host system 204 including data 205 contained in source files which are accessed by the editor 202. The host system 204 is implemented using a line-oriented file (record) management system. In some embodiments, the host system 204 comprises a legacy system or mainframe such as the S/390 or AS/400 platforms. The host system 204 may be remotely located. In some embodiments, the host system 204 is implemented using EBCDIC encoding, and the server 34 (FIG. 2) is implemented using Unicode. In other embodiments, the host system 204 is implemented using ASCII (American National Standard Code for Information Interchange) encoding.

The editor 202 is implemented using line-oriented management which includes support of a column-defined sequence numbers area, edit operations constrained by column-defined fields, maintenance of a maximum/fixed record length, and emulation of host system editing. The editor 202 loads a line-oriented text document (editor document) 206 into memory 104 from a source document or file stored on the host system 204. The editor document 206 comprises records 207 each having a text element 208 and a corresponding sequence number 210, document management data 212, and document view management data 214. The sequence numbers 210 are defined in the source file in host system byte-specified column positions and are extracted from the file records upon the loading of the editor document 206. The sequence numbers 210 are maintained separately in the source file with optional numeric and/or textual components and are displayed separately (custom-formatted). When changes made during an edit session are to be saved, the editor 202 saves the file on the host system 204 at which time the sequence numbers are re-assembled in the source file. The document management module 220 maintains sequence numbers 210, for example by adding or deleting sequence numbers as records are added or deleted, and re-sequences sequence numbers 210 when the numbers are too large or according to predetermined settings, or at a time chosen by the user of the editor 202.

In one embodiment, the sequence numbers 210 include a numeric component 216 and a textual component 218. The numeric component 216 is automatically maintained in sequence. If a new record is added, it is assigned a sequence number 210 associated with the position of the new record within the document. The value of each numeric component 216 is defined by an initial number and an increment related to the position of the associated record 207 in the record sequence. For example, where the initial sequence number (i.e. of the first record) is 100 and sequence numbers are incremented by multiples of 100, the value of the numeric component 216 of the third record is 300. As a result of the edit operation among other reasons, the sequence numbers 210 may not always be separated by the same increment (i.e. if automatic re-sequencing is not set in the editor 202). However, the sequence numbers 210 may be re-sequenced by the editor 202 at the start or end of an edit session, or at a time chosen by the user of the editor 202. The initial number and increment for the sequence numbers 210 are host system specific and vary between systems. In some cases, the value of the increment may change between user sessions.

The textual component 218 may be a flag, for example to indicate that a modification has been made during the current session, or a date and/or time reference to indicate when the associated record 207 was last modified. The textual component 218 is automatically updated when a text element 208 is modified during editing. Table 1 provides exemplary records of a line-oriented text document having both a numeric component 216 and textual component 218.

TABLE 1

Exemplary Records of Line-Oriented Text Document

Sequence Numbers

| Numeric Component | Textual Component | Text Element |
|---|---|---|
| 00100 | Aug. 17, 1976 | Line 1 is the first record |
| 00200 | Aug. 17, 1976 | Line 2 is the second record |
| 00300 | Dec. 20, 1976 | Line 3 is the third record |

Table 1 shows three records of an editor document 206 in which the numerical components 216 of the sequence numbers 210 are 00100, 00200, and 00300. The textual component 218 of the sequence numbers 210 indicates the date the corresponding record was last modified in the format month/day/year (MM/DD/YYYY).

The handling of sequence numbers varies between host systems. The present invention is not limited to any particular host system or any particular sequence number management scheme. The maximum length of each record, whether the sequence numbers include both a numeric and textual component or merely a numeric component, the byte-size of column(s) in the sequence number area, the location of columns in each record, and which columns are reserved for the text element and which are reserved for sequence numbers and other non-text elements are all host system specific and may vary between host systems. For example, some host systems have a maximum record length of 80 characters (bytes) whereas other host systems have a maximum record length of 100 characters. In some systems, the sequence numbers may include numerical and textual components 6 bytes in length which are defined in byte columns 1-6 and 7-12 respectively. In other systems, the numerical and textual components may be 8 bytes in length and are defined in byte columns 73 to 80. The foregoing examples are merely provided as examples of sequence numbers, and the particular formats and features of the sequence numbers described are not intended as limitations of the present invention.

Figure 5:
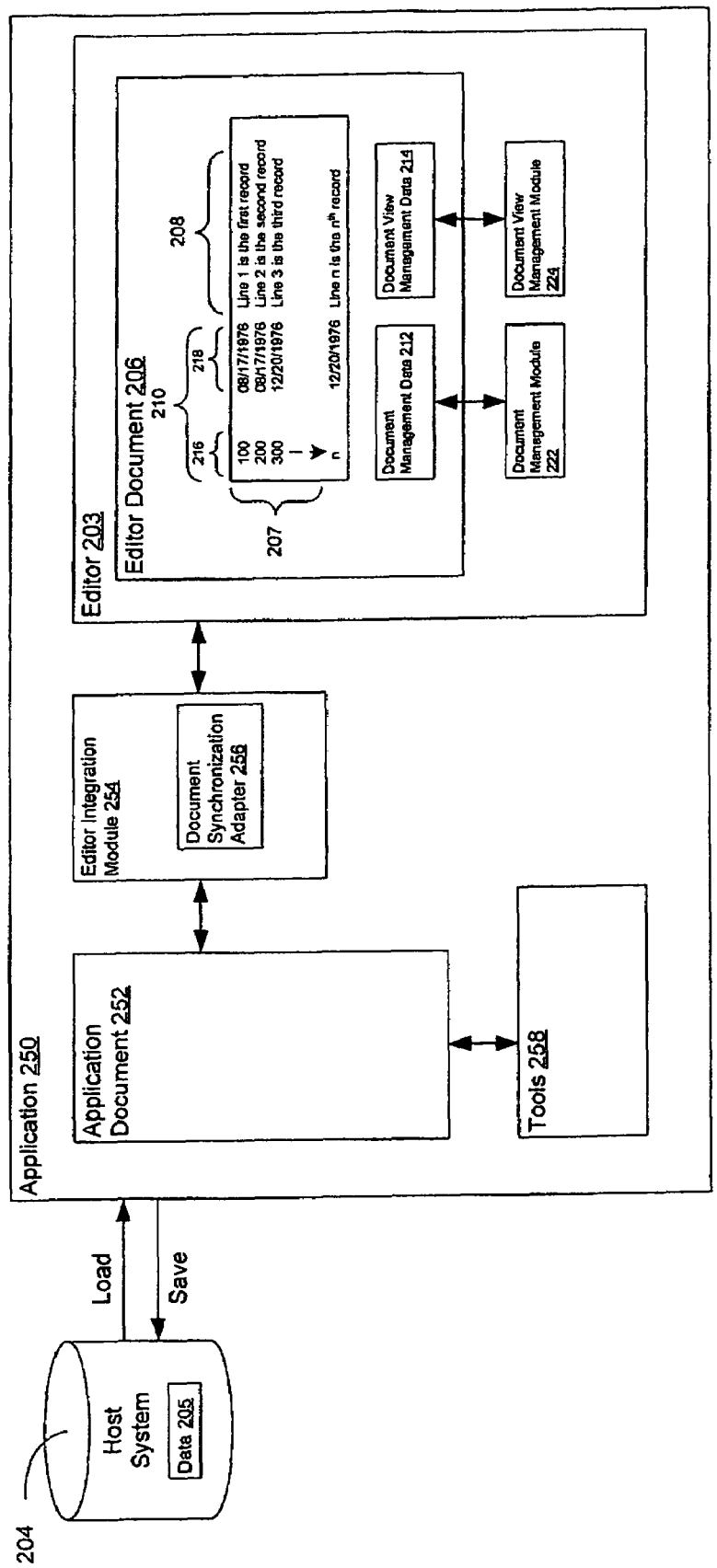
FIG. 5 is a schematic diagram of a stream-oriented application implemented according to the present invention.

Reference is now made to FIG. 5, which shows a stream-oriented application 250 implemented according to the present invention. The stream-oriented application 250 integrates a line-oriented text editor (editor) 203 similar to the editor 202 (FIG. 4). The stream-oriented application (application) 250 includes the editor 203, an editor integration module 254 having a document synchronization adapter 256, and tools 258, for example file export/import, find and replace, dictionary, and auto-save functions.

The application 250 loads a stream-oriented text document (application document) 252 into memory 104 (FIG. 3) from a source file stored on the host system 204. Similarly, the editor 203 loads a line-oriented text document (editor document) 206 into memory 104 from the application document 252, or directly from the source file on the host system 204. Multiple editor documents 206 and application documents 252 may be opened at one time. The application document 252 and editor document 206 handle the source file differently as a result of differences between stream-oriented management and line-oriented management. The editor integration module 254 allows the application 250 to communicate with both the editor document 206 and the application document 252 and synchronize changes made in the documents (e.g. resulting from a find and replace operation). The application document 252 and editor document 206 need to maintain an accurate image of the current version of the complete document at all times, for example as the source file is being saved, accessed or viewed by tools 258 integrated into the application 250. If the content of the editor document 206 is changed, that change must be reflected in the application document 252 and vice versa.

A typical line-oriented editor document 206 has the following characteristics:

(1) variable-length text elements 208 corresponding to records of the underlying source file, and "show" elements used for rendering various informational embedded messages (such as document-parser or compiler error messages);

(2) a separately maintained sequence number area 210 defined by host system DBCS (double-byte character set) sensitive byte-column positions in each record 207, outside of the text element area proper of the record;

(3) support for document-change and document-adjustment listeners;

(4) an API (Application Programming Interface) for line-oriented operations wherein access and operations are defined in terms of elements and positions inside the elements; line delimiters may be included; and (5) an elementary API for stream-oriented access.

A typical stream-oriented application document 252 has the following characteristics:

(1) a stream of the entire content of the underlying source file, including line delimiters;

(2) the document may be shared by the intrinsic functions (e.g. search, maintenance of task/debug markers) of the application 250 and other tools 258 installed in the application 250;

(3) support for document-change listeners;

(4) a generic API for stream-oriented operations wherein access and operations are defined in terms of character offsets from the start of the stream, and the length in characters of the affected text range; and (5) an elementary API for line-oriented access.

Examples 1 and 2 illustrate some of the differences between editor documents 206 and application documents 252.

EXAMPLE 1

An editor document 206 in an editor 203 having three fixed-length records may have the following form:

| Sequence Numbers | | |
|---|---|---|
| Numeric Component byte columns 1-6 | Textual Component byte columns 7-12 | Text Element byte columns 13-18 |
| 100 | 021201 | line01 |
| 200 | 021201 | DD |
| 300 | 021207 | line03 |

Each line in the editor document 206 forms a record 207 with a fixed length of 18 characters (bytes). In this case, the sequence numbers include numerical and textual components 6 bytes in length each, which are defined in byte columns 1-6 and 7-12 respectively. The text elements are defined in byte columns 13 to 18. DD is two Unicode characters, which are converted in the host source file (an EBCDIC DBCS character encoding in this example) to (from) a sequence comprising 6 bytes: a Shift-Out control character, two double-byte characters, and a Shift-In control character.

An application document 252 corresponding to the foregoing editor document 206 may appear as follows:

000100021201line01<eol>000200021201DD<eol>0003000212071line03<eol> where <eol> is an end of line character (line delimiter) used to indicate the end of the record.

The application document 252 is a stream of characters and lacks the hierarchical structure of the editor document 206. The application document 252 has no knowledge of byte-specified column positions in the character encoding of the original platform of the document (such as a legacy host system), however to reflect the end of a record an <eol> character is included where the end of a record would normally occur in the source file.

EXAMPLE 2

An editor document 206 belonging to an editor 203 implemented in Unicode where the fixed-length record source file belongs to a host system implemented using EBCDIC encoding may have the following form:

| Sequence Numbers | | |
|---|---|---|
| Numeric Component byte columns 7-10 | Textual Component byte columns 11-14 | Text Element byte columns 1-6, 15-20 |
| 1 | 0001 | line1aline1b |
| 2 | 0002 | DDline2b |
| 3 | 0003 | line3aline3b |

Each line in the editor document forms a record with a fixed length of 20 characters, similar to example 1. However, the sequence numbers of this host system include numerical and textual components 4 bytes in length each, which are defined in byte columns 7 to 10 and 11 to 14 respectively. Text elements are defined in the remaining positions, namely byte (rather than character) columns 1 to 6 (i.e. before the sequence numbers), and 15 to 20 (after the sequence numbers 210).

An application document 252 belonging to an application 250 implemented in Unicode corresponding to the foregoing editor document 206 may appear as follows:

line 1a00010001line1b<eol>DD00020002line2b<eol>
line3a00030003line3b<eol> where DD is two Unicode characters in the application and editor documents, which are converted in the host source file to (from) a sequence comprising 6 bytes: a Shift-Out control character, two double-byte characters, and a Shift-In control character.

As in example 1, the application document 252 lacks column-defined support of sequence numbers. The stream of characters in the application document 252 is assembled in a sequence corresponding to character byte positions in the source file. In this example, the sequence number area occurs in the middle of each record 207. Accordingly, when a record 207 is assembled in the application document 252 by the editor integration module 254, the first six characters of the text element 208 of each record (byte positions 1 to 6) are assembled first, after which the sequence number characters are inserted (byte positions 7 to 14). The remaining text element characters are assembled in byte positions 15 to 20, and an <eol> character is inserted to mark the end of the record. This procedure is repeated for each record in the source file.

Figure 6:
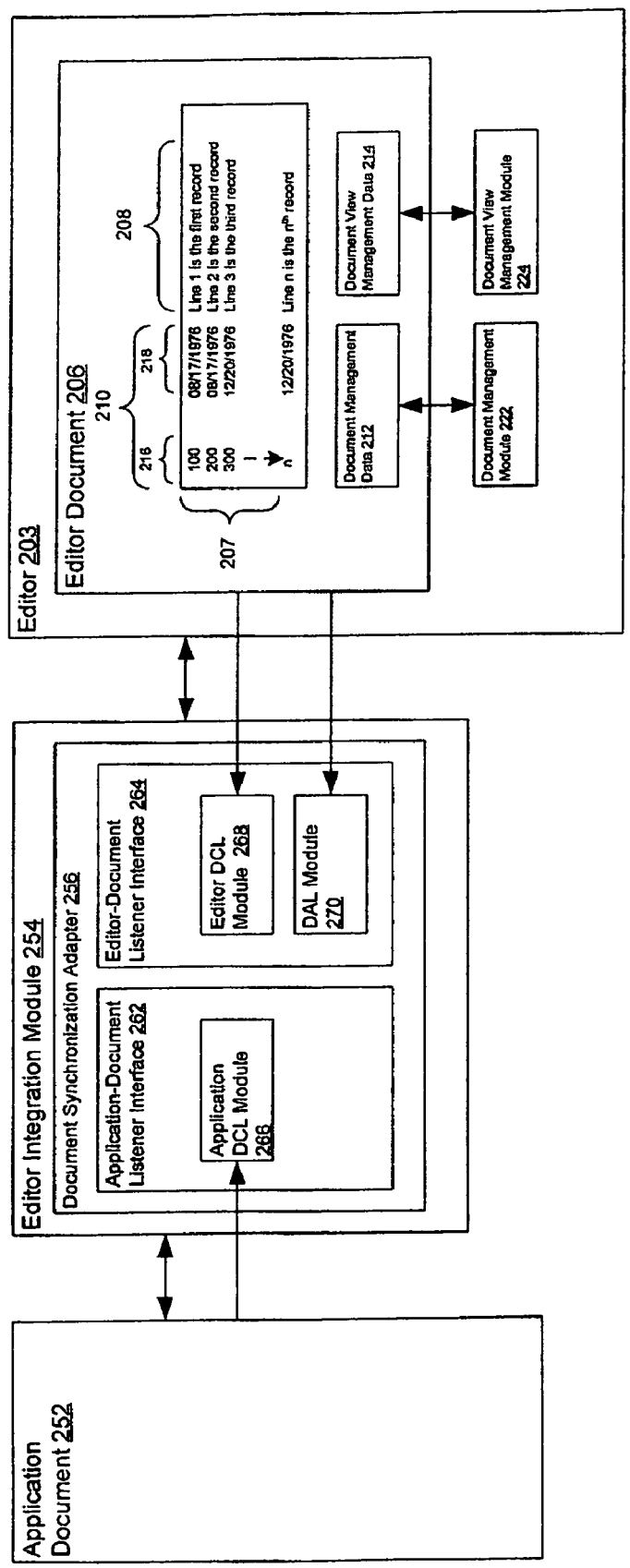
FIG. 6 is a schematic diagram of a document synchronization adapter for the stream-oriented application of FIG. 5.

Referring now to FIG. 6, the editor integration module 254 will be explained in more detail. The editor integration module 254 is implemented in functional modules in the application 250 (FIG. 5) and executed by the processor 102 (FIG. 3) during operation. The editor integration module 254 employs a two-way document synchronization adapter 256 to translate application document changes into editor document changes and vice versa. Document changes received from either source are synchronized through document-change listeners (DCLs) registered for the editor 203 and the application 250, and a document-adjustment listener (DAL) registered for the editor 203.

The document synchronization adapter 256 implements two interfaces: an application-document listener interface 262 and an editor-document listener interface 264. The application-document listener interface 262 includes a document-change listener module (Application DCL module) 266 which implements document-change listeners for application documents 252. The editor-document listener interface 264 includes a document-change listener module (Editor DCL module) 268 and a document-adjustment listener module (DAL module) 270 which implement document-change listeners and document-adjustment listeners for editor documents 206 respectively. Document-change listeners and document-adjustment listeners are specialized document listeners that are implemented by a Document Event API. Document Event APIs and other aspects of document listener implementation are standard API components.

The document synchronization adapter 256 also provides support utilities to translate text coordinates in the stream of the application document 252 to text coordinates in the structure of elements of the editor document 206 and vice versa, employing the elementary API for line-oriented access provided by the application document 252 and the elementary API for stream-oriented access provided by the editor document 206.

Document-change listeners are registered in the Editor DCL module 268 for each editor document 206, which may be shared by several document (editing) views. When an application 250 (FIG. 5) imposes its own document view management (keeping several views of the same document in sync through document-change notifications), the editor integration module 254 prevents duplication of notifications by separating inter-view notifications from inter-document synchronization notifications. Similarly, document-change listeners are registered in the Application DCL module 266 for each application document 252.

Document-change listeners listen for document events in the respective documents they listen to, and notify the document synchronization adapter 256 of any document event. A document event occurs when the contents of a document change in any way. Thus, a document even will occur when a change is made in the text of an editor or application document, including a change in the sequence numbers 210.

The document-adjustment listener is a special case of a document-change listener that listens for document-adjustment events in the editor document 206 listened to, and notifies the document synchronization adapter 256 of any document-adjustment events. A document-adjustment event occurs when the editor automatically adjusts the sequence numbers and/or the text in the editor document 206 as the direct result of a document event (change) in the editor document 206. For example, a document-adjustment event will occur when a change (such as user editing, or a change propagated from the application document 252 through the editor integration module 254) is made to a text element 208 and, as a result of this, the editor automatically adjusts the sequence numbers area and the text in order to maintain a fixed length of the affected line. The document synchronization adapter 256 is capable of listening to any changes in the editor document content through the editor DCL module 268, or only to document-adjustment changes in the editor document content through the editor DAL module 270. The document synchronization adapter 256 uses document event and document-adjustment event notifications to translate application document changes into editor document changes and vice versa.

Figure 7:
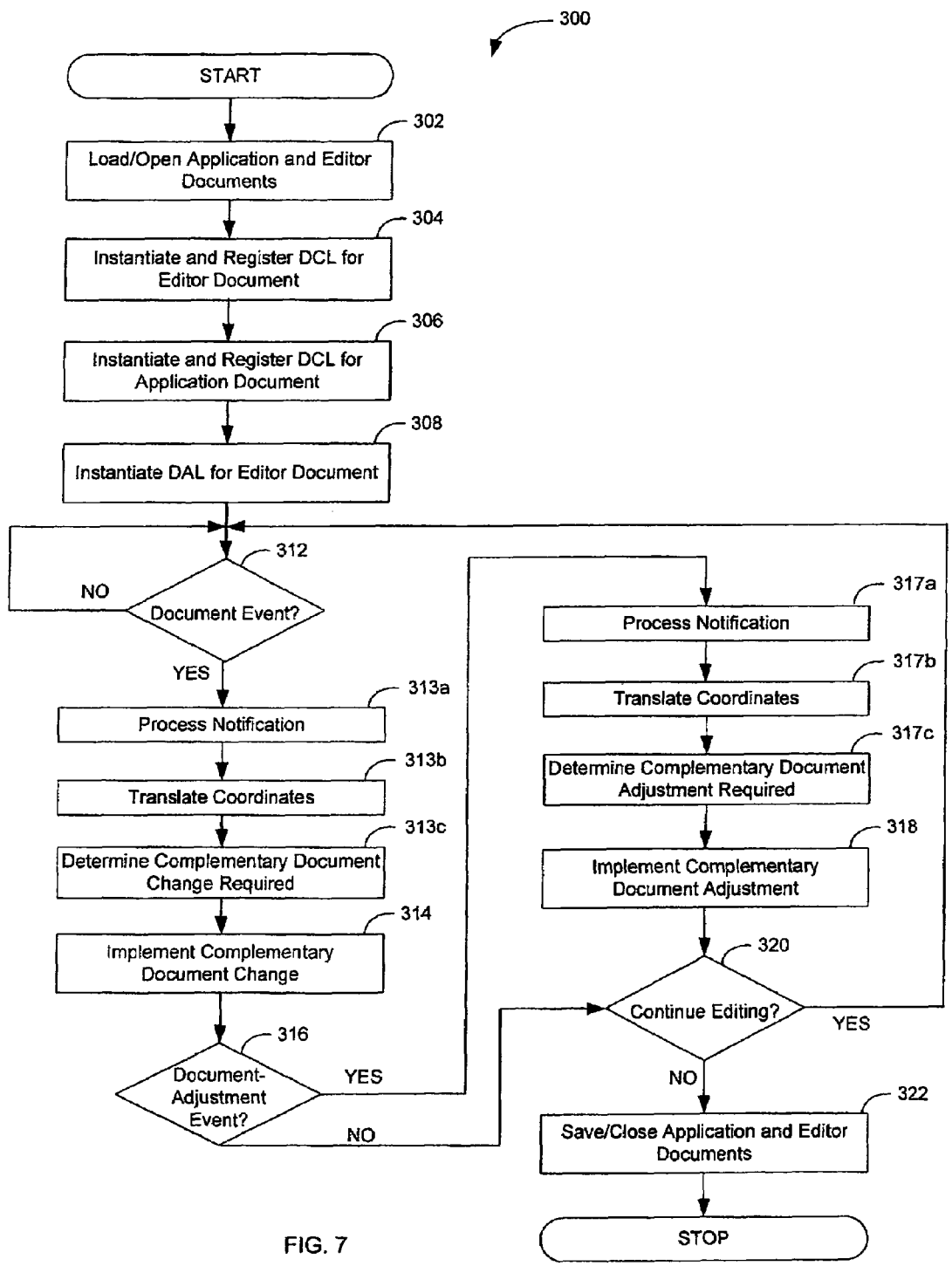
FIG. 7 is a flowchart of a procedure for synchronizing the contents of an application document and an editor document in the stream-oriented application of FIG. 5.

Referring now to FIG. 7, a procedure 300 for synchronizing the contents of an application and editor document will be described. In the first step 302, an application document 252 and an editor document 206 are loaded or opened from a source file on the host system 204. Next, the document synchronization adapter 256 instantiates and registers a document-change listener for the editor document 206 (step 304). A document-change listener is then instantiated and registered for the application document 252 (step 306). Next, the document synchronization adapter 256 instantiates a document-adjustment listener for the editor document 206 (step 308). The document-adjustment listener is normally suspended (i.e. not registered to listen). It will be appreciated by those of skill in the art that the order in which the editor and application documents are loaded may be changed, and that the document listeners may be instantiated and registered in a different order without departing from the scope of the present invention.

The document synchronization adapter 256 then waits for a notification from a document-change listener of a document event in the editor or application document (decision block 312). When a document event is detected, the corresponding listener sends a notification to the document synchronization adapter 256. The document synchronization adapter 256 then processes the notification (step 313*a*), translates the notification event's text change coordinates into the text coordinates in the other document (313*b*), and determines the complementary document change required in the document requiring updating (313*c*). Next, the document synchronization adapter 256 implements the complementary document change in the document requiring updating (step 314). To prevent echoing back of the changes implemented by the document synchronization adapter 256, the document-change listener for the document to be updated is suspended until the complementary document change has been made by the document synchronization adapter 256. However, editor-initiated adjustments to these changes are sent back to the adapter 256. After the complementary document change has been made, the suspended document-change listener is re-registered.

Where the complementary document change implemented was made in the editor document 206, an adjustment may have been made to a sequence number 210 in its numerical component 216 and/or textual component 218, if any (i.e. a document-adjustment event). If a document-adjustment event is detected (decision block 316), the document-adjustment listener sends a notification to the document synchronization adapter 256. The document synchronization adapter 256 then processes the notification (step 317*a*), translates the notification event's text adjustment coordinates in the editor document 206 into text coordinates in the application document 252 (step 317*b*), and determines the complementary document adjustment required (step 317*c*). Next, the document synchronization adapter 256 suspends the document-change listener for the application document 252. The adapter 256 then implements a complementary document adjustment in the application document 252 (step 318). Next, the document-change listener for the application document 252 is re-registered. Following the above method, the content of an application document and editor document can be synchronized.

If no further editing is required (decision block 320), the user clicks "Save" or otherwise selects to store the source file in the host system 204 (e.g. by exiting or closing the application 250) (step 322). The source file can be saved from either the editor 203 or application 250.

Figure 8:
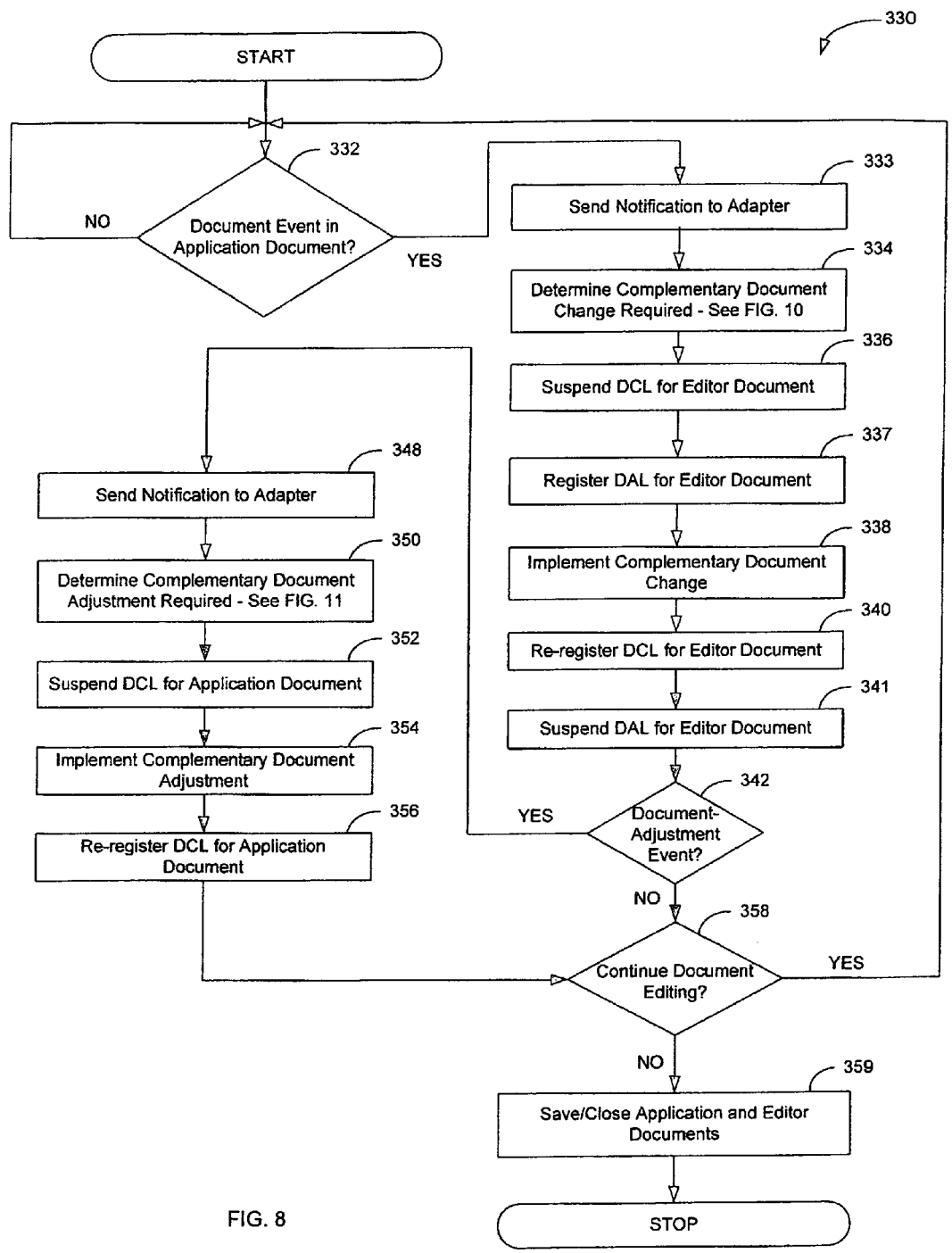
FIG. 8 is a flowchart of a procedure for updating an editor document in response to a document event in an application document in the stream-oriented application of FIG. 5.
Figure 10:
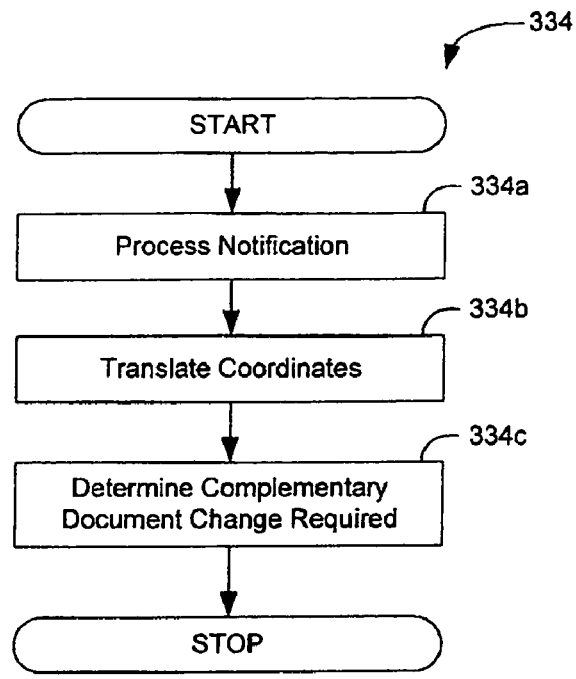
FIG. 10 is a flowchart of a procedure for determining a complementary document change required in an editor document in response to a document event in an application document in the stream-oriented application of FIG. 5.
Figure 11:
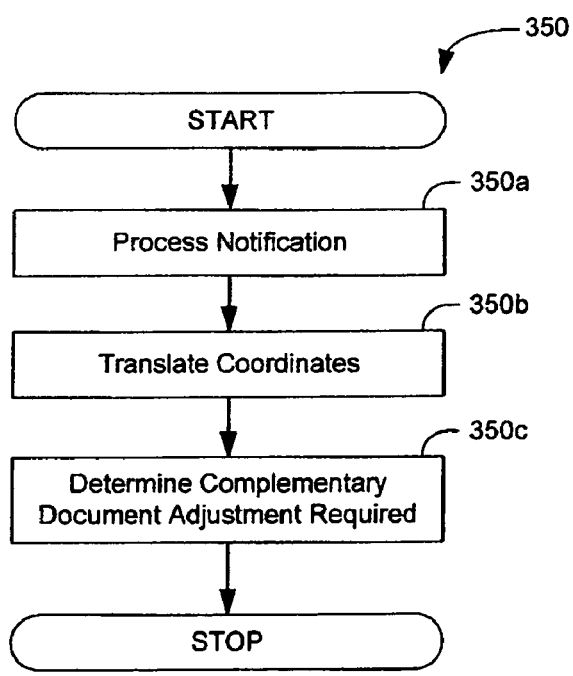
FIG. 11 is a flowchart of a procedure for determining a complementary document adjustment required in an application document in response to a complementary document change in an editor document in the stream-oriented application of FIG. 5.

Referring now to FIGS. 8, 10 and 11, a procedure 330 for updating an editor document in response to a document event in an application document will be described. First, the document-change listener for the application document 252 must determine whether a document event has occurred, i.e. in the content of the application document 252 (decision block 332). If a document event has occurred, the document-change listener sends a notification to the document synchronization adapter 256 informing it of the document change (step 333). Depending on the type of document event (change), the notification may be sent before or after the change actually takes place in the application document 252. The types of document changes that are possible are described more fully below. The document synchronization adapter 256 then processes the notification (step 334*a*, FIG. 10), translates the notification event's text change coordinates into the text coordinates in the other document (334*b*, FIG. 10), and determines the complementary document change that is required to update the editor document 206 (334*c*, FIG. 10). A complementary document change is a change in the content of a document that is required to translate an application document change into an editor document change or vice versa.

In the next step 336, the document-change listener for the editor document 206 is suspended. Suspending the document-change listener prevents echoing back of the changes implemented in the editor document 206 to the adapter 256. Next, in step 337 the document-adjustment listener for the editor document 206 is registered. Next, the document synchronization adapter 256 implements the complementary document change in the editor document 206 (step 338). The document-change listener is then re-registered for the editor document 206 (step 340). Next, in step 341 the document-adjustment listener for the editor document 206 is suspended.

The next step is to determine whether a document-adjustment event has occurred in the editor document 206, e.g. a change to the sequence numbers 210 (decision block 342). Some editor document changes may result in a change to the sequence numbers 210 and/or a text element 208 of one or more lines. For example, where a new line or record 207 is inserted in the editor document 206 or where a line is removed, a change may be made to the sequence numbers 210. In other cases, for example where no record 207 is added or deleted and there is no textual or numerical component being maintained to the sequence numbers 210, a document adjustment may not be made.

If a document-adjustment event has occurred, the document-adjustment listener sends a notification to the document synchronization adapter 256 informing it of the document adjustment (step 348). The document synchronization adapter 256 processes the notification (step 350*a*, FIG. 11), translates the notification event's text adjustment coordinates in the editor document 206 into text coordinates in the application document 252 (step 350*b*, FIG. 11), and determines the complementary document adjustment that is required in the application document 252 (step 350*c*, FIG. 11). A complementary document adjustment is a change in the sequence number characters or text in an application document that is required to translate an editor document adjustment to an application document change.

In the next step 352, the document-change listener for the application document 252 is suspended. Suspending the document-change listener prevents echoing back of the changes implemented in the application document 252 to the adapter 256. Next, the document synchronization adapter 256 implements the complementary document adjustment in the application document 252 (step 354). The document-change listener is then re-registered for the application document 252 (step 356).

If no further editing' is required (decision block 358), the user clicks "Save" or otherwise selects to store the source file in the host system 204 (e.g. by exiting or closing the application 250) (step 359). The source file can be saved from either the editor 203 or application 250.

It will be appreciated by those of skill in the art that the order of steps in which the editor and application document-change listeners are suspended and (re-)registered, and the manner in which document-change event notifications are recorded and processed may be changed depending on the particular capabilities of the application and other design decisions, without departing from the scope of the present invention.

Figure 9:
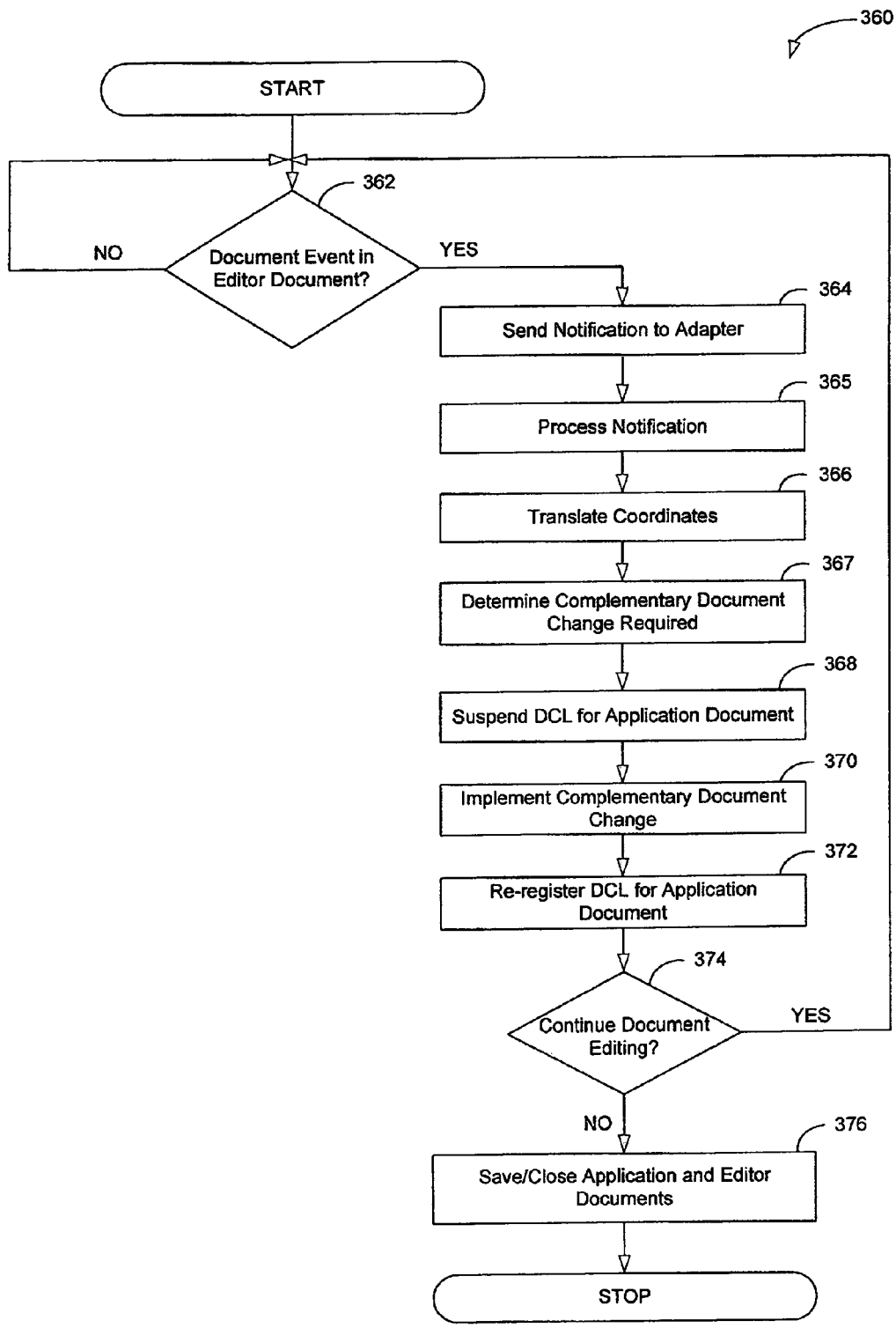
FIG. 9 is a flowchart of a procedure for updating an application document in response to a document event in an editor document in the stream-oriented application of FIG. 5.

Referring now to FIG. 9, a procedure 360 for updating an application document in response to a document event in an editor document will be described. First, the document-change listener for the editor document 206 must determine whether a document event has occurred, i.e. in the content of the editor document 206 (decision block 362). If a document event has occurred, the document-change listener sends a notification to the document synchronization adapter 256 informing it of the text change that has occurred (step 364). Depending on the type of document event (change), the notification may be sent before or after the change actually takes place in the editor document 206. The document synchronization adapter 256 processes the notification (step 365), translates the notification event's text change coordinates in the editor document 206 into text coordinates in the application document 252 (step 366), and determines the complementary document change that is required in the application document 252 (step 367).

In the next step 368, the document-change listener for the application document 252 is suspended. Suspending the document-change listener prevents echoing back of the changes implemented in the application document 252 to the adapter 256. Next, the document synchronization adapter 256 implements the complementary document change in the application document 252 (step 370). The document-change listener is then re-registered for the application document 252 (step 372).

Unlike complementary document changes performed in editor documents 206, there are no complementary document changes in application documents 252 and consequently no application document-adjustment events. It is the responsibility of the editor to accommodate features (such as sequence numbers support) and constraints (such as record-length limits) of source files in the host system 204. It should, however, be appreciated by those of skill in the art that procedures similar to those described in FIG. 7 and 8 can be implemented to handle application document-adjustment events, if needed in a particular environment, without departing from the scope of the present invention.

If no further editing is required (decision block 374), the user clicks "Save" or otherwise selects to store the source file in the host system 204 (e.g. by exiting or closing the application 250) (step 376). The source file can be saved from either the editor 203 or application 250.

Document changes that may be performed by the line-oriented editor 203 will now be explained. Edit operations may affect parts of a text element 208 or may affect an entire record. Edit operations that affect only part of a text element 208 are referred to as text operations. The following are examples of text operations that may be performed using the editor 203:

(1) text deletion;
(2) text insertion; and
(3) text replacement.

Edit operations that affect an entire text element 208 are referred to as element operations. The following are examples of element operations that may be performed using the editor 203:

(1) element deletion;
(2) element insertion; and
(3) element replacement.

Complex operations, such as text-block moving, copying, re-sequencing of the numerical component 216 of sequence numbers 210, and maintenance of the textual component 218, may be broken down into a series of text and/or element operations enumerated above.

The document text changes discussed above may originate from the following sources:

(1) load and save operations in the editor document 206;
(2) text editing performed by a user of the editor 203 (including undo/redo operations);
(3) text changes performed in the application 250 on the application document 252 (e.g. a find-and-replace operation), or by a separate tool 258 installed in the application 250 (such as a text re-formatter or source-code beautifier); or
(4) document (host system specific) text adjustments carried out automatically by the editor 203.

Document text operations in the stream-oriented application document 252 are expressed in terms of replace operations defined by the character offset in the stream, the range of characters being replaced, and the replacing text.

Document adjustments that may be performed in the editor 203 will now be explained. In certain cases, document text being set in the editor 203 is automatically adjusted, depending on the editor settings in effect. For example, automatic adjustments may be made when the source file is loaded as an editor document 206, or during the opening in the editor 203 of a local file targeted for save on the host system 204.

Examples of cases in which the editor document text is adjusted when set in the editor 203 include:

(1) padding of the text up to (the end of) the sequence number area in one or more text elements 208;
(2) reinterpretation of document contents as sequence numbers 210 in one or more text elements 208 (e.g. files that were edited with a workstation editor that does not provide adequate support for sequence numbers 210)
(3) re-sequencing of the numeric component 216 of sequence numbers 210 of one or more text elements 208;
(4) changes in the textual component 218 of the sequence numbers 210 when sequence numbers are being maintained automatically (e.g. set to the current date upon modification of the corresponding text element 208);
(5) text adjustment in one or more elements 208 for maintaining correct sequence number 210 columns, wherever DBCS or MBCS (multi-byte character set) text in the editor (for example, an editor operating with Unicode-converted characters) would conflict (upon conversion to the host system character encoding) with the location of the host system file's sequence numbers 210 (DBCS or MBCS characters being translated on the host system into two-byte or n-byte characters, optionally with escape sequences such as Shift-Out and Shift-In control characters being added in the case of EBCDIC DBCS character encoding);

(6) creation of sequence number areas for locally-created files targeted for a host system 204; and (7) the addition of a line delimiter (EOL indicator) character at the end of text elements 208.

Further adjustments may take place during the save operation, when a text-limit setting is in effect (for a maximum/ fixed record length in the host file). While the saved (or host auto-saved) host source file conforms to the text-limit setting in effect, the editor document 206 contents are kept "as is", allowing the user to correct non-conforming text elements (and to be saved in full during local auto-saves or by "save as" operations). This is accomplished through pre-save and post-save notifications generated for the sole benefit of the application document 252 used during the save operation. An exemplary procedure for implementing such notifications is as follows:

(1) trigger a series of truncation editor document change notification events for all elements that exceed the text limit in effect;

(2) call to save the application document 252; and (3) trigger a series of truncation-restore editor document change notification events for these elements.

After most editor-initiated document adjustments, the contents of the document are still marked as 'clean' (not 'dirty') until a user-initiated change takes place.

Examples 3 and 4 illustrate typical document change and document-adjustment events.

EXAMPLE 3

Delete-Selection Operation in Editor

An editor document 206 and application document 252 both operating in Unicode corresponding to a variable record length source file in EBCDIC may appear as follows:

Editor Document:

| Sequence Numbers | | Text Element |
|---|---|---|
| Numeric Component byte columns 7-10 | Textual Component byte columns 11-14 | byte columns 1-6, 15-80 |
| 1 | 0001 | DDline1xyz |

DD is two Unicode characters, which are converted in the host source file (an EBCDIC DBCS character encoding in this example) to (from) a sequence comprising 6 bytes: a Shift-Out control character, two double-byte characters, and a Shift-In control character.

Application Document:

DD00010001line1xyz<eol>

If the user selects and deletes the first two characters in the record (DD), the deletion operation triggers a change of the textual component 218 of the sequence number 210 to the default text ("AAAA") defined in the editor 203 for changed/ new lines when automatic maintenance of sequence numbers 210 is in effect in the editor 203, and the file record 207 is reassembled from the new text element and sequence numbers 210. The corresponding editor document 206 and application documents 252 would appear as follows:

Editor Document:

| Sequence Numbers | | Text Element |
|---|---|---|
| Numeric Component byte columns 7-10 | Textual Component byte columns 11-14 | byte columns 1-6, 15-80 |
| 1 | AAAA | line1xyz |

Application document:

line1x0001AAAAyz<eol>

EXAMPLE 4

Insert Operation in Editor

In EBCDIC and ASCII encodings, some foreign language characters such as Asian language characters are represented by double-byte or n-byte characters. EBCDIC encodings also use a Shift-Out and Shift-In control characters to delineate foreign language characters; other encodings use other escape sequences. In contrast, Unicode normally uses regular characters on a 1-to-1 basis and without escape controls to represent Asian language characters. By way of example, the expression "I AM $J^1J^2$." where $J^1$ and $J^2$ are Japanese language characters would be handled by the various encoding schemes as follows:

| Encoding Scheme | Text element | Length of Text Element (Characters/Bytes) |
|---|---|---|
| UNICODE | I§AM§$J^1J^2$. | 8 |
| ASCII | I§AM§DDDD. | 10 |
| EBCDIC | I§AM§$^{SO}$DDDD$^{SI}$. | 12 | where
§ is a "space" character,
$^{SO}$ is a shift-out character,
$^{SI}$ is a shift-in character, and
each DD represents one double-byte character.

If one non-Japanese character is inserted in an application document 252 between $J^1$ and $J^2$, the corresponding text elements would be changed as follows:

| Encoding Scheme | Text element | Length of Text Element (Characters/Bytes) |
|---|---|---|
| UNICODE | I§AM§$J^1TJ^2$. | 9 |
| ASCII | I§AM§DDTDD. | 11 |
| EBCDIC | I§AM§$^{SO}$DD$^{SI}$T$^{SO}$DD$^{SI}$. | 15 |

If the insertion of the additional character results in the text element 208 of the editor document 206 exceeding the maximum record length for the editor document 206 and/or the source file as a result of differences in encoding schemes, the editor 203 is required to perform a document adjustment, for example, by creating a new record so that the changed text element 208 conforms with the editor document or host system requirements.

Pseudo-code (similar to the Java programming language) of a partial code implementation of an example embodiment of the present invention will now be described. A non-integrated or standalone line-oriented text editor, such as editor 202, may not necessarily provide a public document-listener mechanism, depending on the structure of its utilities and document-view management. For example, document-parsers parsers (which handle syntax coloring and other context-sensitive functions) registered in the editor have their own specialized triggering mechanism for total-parse and incremental-parse notifications. A generic document-change listener, however, must be implemented for the editor 203 in order to integrate it in the application 250.

The editor document listener interface method editorDocumentChanged( ) is a notification method that is called by an actively registered document-change or document-adjustment listener when a document change event occurs in an editor document 206. The method editorDocumentChanged( ) may be defined in the document synchronization adapter 256 as follows:

```
void editorDocumentChanged (editorDocumentEvent event);
    event.editorDocument - the editor document that triggered the notification
    event.type - notification type:
        TEXT_REMOVED - notification sent when text is deleted in a text element; it is
        sent before the actual change takes place in the document
        TEXT_REPLACED - notification sent when text is replaced in a text element; it is
        sent after the actual change takes place in the document
        TEXT_INSERTED - notification sent when text is inserted in a text element; it is
        sent after the actual change takes place in the document
        ELEMENT_REMOVED - notification sent when a text element is deleted from
        the document; it is sent before the actual change takes place in the document
        ELEMENT_REPLACED - notification sent when a text element is replaced in the
        document; it is sent after the actual change takes place in the document
        ELEMENT_INSERTED - notification sent when a text element is inserted in the
        document; it is sent after the actual change takes place in the document
    event.line - document line involved, defined inside the document section that is currently
    loaded in the editor
    event.position - first change position inside the line, or 0 for element notifications
    event.length - length of the change in the line, or 0 for element notifications
```

The method editorDocumentChanged( ) applies to changes in the entire text of a record 207, i.e. including the sequence numbers 210. No notifications are sent for 'show' elements (such as document parser imbedded error-message lines). Certain editing operations performed by the editor 203 may trigger several consecutive notifications for one change which has already been recorded in the text of an element 208. For example, one replace-text action may trigger a series of notifications indicating the text replaced, the text inserted beyond the end of the original line, and a change in the textual component 218 of a sequence number 210.

The document-adjustment listener implements the regular document listener interface, but it is registered in the editor 203 in a separately-maintained list of listeners through the dedicated methods addDocumentAdjustmentListener( ) and removeDocumentAdjustmentListener( ). The notifications sent by document-adjustment listeners are defined in the same set as those for document-change listeners. Notification events for all the content changes in the editor document, regardless of their origin, are sent to its registered document-change listeners; in addition, notification events for the document-adjustment changes are also sent by the editor to its registered document-adjustment listeners.

The synchronization of an editor document 206 and an application document 252 in the context of the application 250 is implemented by the (re) registration (add-listener method) and de-registration (remove-listener method) of document-change listeners for the editor and application documents by the document synchronizer adapter 256. The application and editor documents it synchronizes are (re) registered and de-registered (disposed) via the methods setApplicationDocument( ) and setEditorDocument( ).

The document synchronizer adapter 256 may be initialized as follows. It implements two interfaces: the application-document listener interface, and the editor-document listener interface. Initially, it is not connected to any document.

```
// Constructor.
DocumentSynchronizer(EditorIntegrationModule editorIntegrator)
    // the editor integration module managing this synchronizer
    EditorIntegrator _editorIntegrator = editorIntegrator;
    // the adapted stream-oriented application document
    ApplicationDocument _applicationDocument = null;
    // the adapted line-oriented editor document
```

-continued

```
    EditorDocument _editorDocument = null;
    // instantiate the direct editor document-adjustment listener
    _eAdjustmentListener = new EditorDocumentListener( ) {
        editorDocumentChanged(editorDocumentEvent event) {
            directEditorDocumentChanged(event);
        }
    }
    // remember the ApplicationDocument event between the
    aboutToChange( ) &
    // changed( ) notification events
    ApplicationDocumentEvent _applicationDocumentEvent = null;
    // & whether it is a complete ApplicationDocument replace
    boolean _eventTotalDoc = false;
    // & the end limit {line,position} for the segment to delete, if any
    int _eventEndLine = -1;
    int _eventEndPosition = -1;
```

The method setApplicationDocument( ) is used to set the given applicationDocument as the application document 252 to be adapted. The method setApplicationDocument( ) may be defined in the document synchronization adapter 256 as follows:

```
// INPUT:
//   applicationDocument - the application document to be adapted, or
//       null if there is no (longer a) document
setApplicationDocument(ApplicationDocument applicationDocument)
    listenToApplicationDocument(false);
```

```
    _applicationDocument = applicationDocument;
    listenToApplicationDocument(true);
```

The method setEditorDocument( ) is used to set the given editorDocument as the editor document 206 being adapted. The method setEditorDocument( ) may be defined in the document synchronization adapter 256 as follows:

```
// INPUT:
//   editorDocument - the editor document to be adapted, or null if there
//      is no (longer a) document
setEditorDocument(EditorDocument editorDocument)
    listenToEditorDocument(false);
    _editorDocument = editorDocument;
    listenToEditorDocument(true);
```

The method listenToApplicationDocument( ) is used to suspend/restore application document listening. The method listenToApplicationDocument( ) may be defined in the document synchronization adapter 256 as follows:

```
// INPUT:
//   listen - true = start / restore listening, or false = suspend listening
listenToApplicationDocument(boolean listen)
    if (_applicationDocument != null) {
       if (listen) {
          _applicationDocument.addDocumentListener(this);
       }
       else {
          _applicationDocument.removeDocumentListener(this);
       }
    }
```

The method listenToEditorDocument( ) is used to suspend/restore editor document listening. The method listenToEditorDocument( ) may be defined in the document synchronization adapter 256 as follows:

```
// INPUT:
//   listen - true = start / restore listening, or false = suspend listening
listenToEditorDocument(boolean listen)
    if (_editorDocument != null) {
       if (listen) {
          _editorDocument.addDocumentListener(this);
       }
       else {
          _editorDocument.removeDocumentListener(this);
       }
    }
```

The method listenToEditorDocumentAdjustments( ) is used to suspend/restore regular editor document-adjustment listening. The document-adjust notifications expected here are not the direct result of an application document-change notification, therefore they are processed like any other editor document changes, i.e. the application document is updated directly. The method listenToEditorDocumentAdjustments( ) may be defined in the document synchronization adapter 256 as follows:

```
// INPUT:
//   listen - true = start / restore listening, or false = suspend listening
listenToEditorDocumentAdjustments(boolean listen)
    if (_editorDocument != null) {
       if (listen) {
          _editorDocument.addDocumentAdjustmentListener(this);
       }
       else {
          _editorDocument.removeDocumentAdjustmentListener(this);
       }
    }
```

The method listenToDirectEditorDocumentAdjustments ( ) is used to suspend/restore direct editor document-adjustment listening. The document-adjust notifications expected here are the direct result of (i.e. handled while) processing an application document-change notification event. Because the application document cannot normally be modified while it is informing its listeners of a previous content change, the document-adjust changes are batched for later (i.e., post event notification) updates to the application document. The method listenToDirectEditorDocumentAdjustments( ) may be defined in the document synchronization adapter 256 as follows:

```
// INPUT:
//   listen - true = start / restore listening, or false = suspend listening
listenToDirectEditorDocumentAdjustments(boolean listen)
    if (_editorDocument != null) {
       if (listen) {
          _editorDocument.addDocumentAdjustmentListener
             (_eAdjustmentListener);
       }
       else {
          _editorDocument.removeDocumentAdjustmentListener
             (_eAdjustmentListener);
       }
    }
```

The method applicationDocumentAboutToChange( ) is defined by the application 40 document-listener interface and is a notification method that is called by a registered application document-change listener when a document change is forthcoming in an application document 252. A stream-oriented application document listener must provide this type of notification in order to allow listeners to record the affected stream-document offset and content range prior to actually carrying out text deletions. Such generic notification issued prior to any text change in an application document also allows the document synchronization adapter 256 to optimize the reaction of the editor to these changes, e.g. in the case of a complete replacement of the document contents (such as the restore of a document from the local auto-save history). The method applicationDocumentAboutToChange( ) may be defined in the document synchronization adapter 256 as follows:

```
// INPUT:
//   event - application-document change event:
//      event.offset - change character offset from start of stream
//      event.length - length of change (in characters)
applicationDocumentAboutToChange(applicationDocumentEvent event)
    _applicationDocumentEvent = event;
    int offset = event.offset;
    int len = event.length;
```

```
            // remember if entire application document is replaced
            // (e.g., change file from local auto-save history)
            __eventTotalDoc = (offset == 0 && len ==
            __applicationDocument.getLength( ));
            // save end {line,position} info from application document for
            // the part to delete, if any
            if (!__eventTotalDoc && len != 0) {
                offset = offset + len;
                __eventEndLine = getApplicationDocumentLine(offset);
                __eventEndPosition = offset −
                getApplicationDocumentOffset(__eventEndLine);
            }
            else {
                __eventEndLine = 0;
            }
```

The method applicationDocumentChanged( ) is defined by the application document-listener interface and is used to implement application document listener notifications where the application document has already changed and the editor document is to be updated accordingly. The method applicationDocumentChanged( ) may be defined in the document synchronization adapter 256 as follows:

```
// INPUT:
//    event - application-document change event:
//        event.offset - change character offset from start of stream
//        event.length - length of change (in characters)
//        event.text - substitution text
applicationDocumentChanged(applicationDocumentEvent event)
    if (__applicationDocumentEvent == null ||
        __applicationDocumentEvent != event ||
        __editorDocument == null) {
        return;
    }
    if (__eventTotalDoc) {
        editorTotalUpdate(event.text);
    }
    else {
        editorUpdate(event.text, event.offset, event.length);
    }
    // refresh the screen of all editor document views
    __editorDocument.refreshAllViews( );
```

The method editorDocumentChanged( ) is defined by the editor document-listener interface and is used to implement editor document change or regular document-adjustment listener notifications where the editor document has already changed and the application document is to be updated accordingly. The method editorDocumentChanged( ) may be defined in the document synchronization adapter 256 as follows:

```
// Regular editor document listener notification - the editor
document has changed,
// or has been adjusted. Update the application document correspondingly.
// INPUT:
//    event - editor document-change listener event (detailed previously)
editorDocumentChanged(editorDocumentEvent event)
    handleEditorDocumentChanged(event, false /* regular change /
    adjustment */);
```

The method directEditorDocumentChanged( ) is used to implement direct editor document-adjustment listener notifications where the editor document has already changed and the application document is to be updated accordingly. The method directEditorDocumentChanged( ) may be defined in the document synchronization adapter 256 as follows:

```
// Direct editor document listener notification - the editor document
has been
// adjusted as a direct result of processing a change notification from the
// application document. Update the application document back
correspondingly.
// INPUT:
//    event - editor document-change listener event (detailed previously)
directEditorDocumentChanged(editorDocumentEvent event)
    handleEditorDocumentChanged(event, true /* direct adjustment */);
```

The method handleEditorDocumentChanged( ) is used to implement application document notification where the editor document has changed or has been adjusted and the application document is to be updated accordingly. The method handleEditorDocumentChanged( ) may be defined in the document synchronization adapter 256 as follows:

```
// INPUT:
//    event - editor document-change listener event (detailed previously)
//    directAdjustment - true = called while processing the originating
application
//        document's notification, so must update back application document
using
//        a post-listener notification event request, or
//    false = update the application document with a regular replace( ) call
handleEditorDocumentChanged(editorDocumentEvent event, boolean
directAdjustment)
    // retrieve information on the editor-document event
    int type = event.type;
    int line = event.line;
    int position = event.position;
    int len = event.length;
    // set up the application-document replace request
    int docOffset;    // change offset
    int docLen;       // how much to delete first
    String docText;   // the text to substitute after
    switch (type) {
        case TEXT_REMOVED:
            docOffset = getApplicationDocumentOffset(line, position);
            docLen    = len;
            docText   = "";
            break;
        case TEXT_REPLACED:
            docOffset = getApplicationDocumentOffset(line, position);
            docLen    = len;
            docText   = getEditorDocumentText(line, position, len);
            break;
        case TEXT_INSERTED:
            docOffset = getApplicationDocumentOffset(line, position);
            docLen    = 0;
            docText   = getEditorDocumentText(line, position, len);
            break;
        case ELEMENT_REMOVED:
            docOffset = getApplicationDocumentOffset(line);
            docLen    = getApplicationDocumentLineLength(line);
            docText   = "";
            break;
        case ELEMENT_REPLACED:
            docOffset = getApplicationDocumentOffset(line);
            docLen    = getApplicationDocumentLineLength(line);
            // includes EOL
            docText   = getEditorDocumentText(line) +
            __editorDocument.getEOL( );
            break;
        case ELEMENT_INSERTED:
            docOffset = getApplicationDocumentOffset(line);
            docLen    = 0;
            docText   = getEditorDocumentText(line) +
            __editorDocument.getEOL( );
            break;
        default:
```

```
        return;
    }
    if (!directAdjustment) {
        applicationUpdate(docText, docOffset, docLen);
    }
    else {
        applicationAdjustmentUpdate(docText, docOffset, docLen);
    }
```

The method applicationUpdate( ) is used to update the application document with the given text for the specified range. As the updates are a consequence of editor document updates or editor document adjustments, it does not trigger changes in the editor document. The method applicationupdate( ) may be defined in the document synchronization adapter 256 as follows:

```
// INPUT:
//   text - substitution text to insert at offset
//   offset - character offset in the application document stream
applicationUpdate(String text, int offset, int len)
    listenToApplicationDocument(false);
    _applicationDocument.replace(offset, len, text);
    listenToApplicationDocument(true);
```

The method applicationAdjustmentUpdate( ) is used to update the application document with the given text for the specified range through a post notification event change. As the updates are a consequence of editor document updates or editor document adjustments, it does not trigger changes in the editor document. The method applicationAdjustmentUpdate( ) may be defined in the document synchronization adapter 256 as follows:

```
// INPUT:
//   text - substitution text to insert at offset
//   offset - character offset in the application document stream
//   len - length of the specified range to delete at offset first
applicationAdjustmentUpdate(String text, int offset, int len)
    // instantiate an application-document replace, which will be run
    // (after the completion of notification event processing) with
    // notifications of application-document changes suspended for the
    // editor document originating this replace
    ReplaceRequest replaceRequest = new ReplaceRequest
    (this, offset, len, text);
    batchApplicationReplace(replaceRequest);
```

The method editorSetText( ) is used to initialize the editor document 206 with the text of the application document 252 when a new file is opened by the application 250. As the updates are a consequence of application document updates, this method does not trigger these changes back into the application document. However, the editor may further adjust the new text, which (regular) adjustments are sent back in the application document. The method editorSetText( ) may be defined in the document synchronization adapter 256 as follows:

```
editorSetText( )
    listenToEditorDocument(false);
    listenToEditorDocumentAdjustments(true);
    _editorDocument.setText(_applicationDocument.getText( ));
```

```
    listenToEditorDocumentAdjustments(false);
    listenToEditorDocument(true);
```

The method editorTotalUpdate( ) is used to update the entire editor document with the given text. This method is called as a result of an application document notification event indicating that the entire contents of the application document 252 have been replaced, e.g. the document was restored to a version from the auto-save history, to reset the contents of the editor document 206. As the updates are a consequence of application document updates, this method does not trigger these changes back into the application document. However, the editor may further adjust the new text, which (regular) adjustments are sent back in the application document. The method editorTotalUpdate( ) may be defined in the document synchronization adapter 256 as follows:

```
// INPUT:
//   text - the new editor document contents
editorTotalUpdate(String text)
    listenToEditorDocument(false);
    listenToDirectEditorDocumentAdjustments(true);
    _editorDocument.setText(text);
    listenToDirectEditorDocumentAdjustments(false);
    listenToEditorDocument(true);
```

The method editorUpdate( ) is used to update the editor document with the given text for the specified range. As the updates are a consequence of application document updates, this method does not trigger changes here in the application document, except for any further editor-specific adjustments done on the new text. The method editorUpdate( ) may be defined in the document synchronization adapter 256 as follows:

```
// INPUT:
//   text - substitution text to insert at offset
//   offset - character offset of the change in application document stream
//   len - length of the specified range to delete at offset first (N/U)
editorUpdate(String text, int offset, int len)
    int line = getApplicationDocumentLine(offset);
    int position = offset - getApplicationDocumentOffset(line);
    listenToEditorDocument(false);
    listenToDirectEditorDocumentAdjustments(true);
    // (1) any deletion of original text in the range
    //      {line,position} . . . {_eventEndLine,_eventEndPosition}
    _editorDocument.deleteFullText(line, position, _eventEndLine,
    _eventEndPosition);
    // (2) any new text insertion
    if (text.length( ) != 0) {
        _editorDocument.insertFullText(text, line, position);
    }
    listenToDirectEditorDocumentAdjustments(false);
    listenToEditorDocument(true);
```

It will be appreciated by those of skill in the art that the present invention is not limited to implementations where the document adjustments created by the complementary document change in the editor document 206 affect the sequence numbers 210 and/or the text length (fixed or maximum) of the records. The present invention may be used to translate changes affecting other text and non-text elements of the editor document 206 and/or the corresponding source file on the host system 204.

Variations of line-oriented text editors and stream-oriented applications implemented according to the present invention are possible. In some embodiments, the editor may not be integrated in an application. In such cases, the editor is a standalone application which interfaces with a stream-oriented application using the editor integration module 254. The editor integration module 254 is adapted for communication between the standalone editor and a stream-oriented application both of which access the same data in the form of a source file stored on a host system. In terms of implementation, the editor integration module 254 may be a separately coded program or integrated into either of the standalone editor or the stream-oriented application. In one example embodiment, the editor integration module 254 and document synchronization adapter 256 are an API of the application 250. Either of the stream-oriented application 250 and the standalone editor 203 may be located remotely, or both may be share a location, for example, on the server 34. In this embodiment, the editor integration module 254 works in a similar manner to when the editor is integrated in the stream-oriented application 250.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer implemented method for synchronizing the contents of a line-oriented document and a corresponding stream-oriented document, the computer implemented method comprising:

loading a line-oriented document and a corresponding stream-oriented document in a memory of a data processing system, wherein the corresponding stream-oriented document is associated with a stream-oriented document event listener API, wherein the line-oriented document is associated with a line-oriented document event listener API, and wherein the line-oriented document comprises records having a text element area and a corresponding sequence number area comprising a line delimiter to indicate an end of a record;

detecting, by the line-oriented document event listener API, a line-oriented document change event, wherein the line-oriented document change event occurs in response to a change in the line-oriented document;

detecting, by the stream-oriented document event listener API, a stream-oriented document change event, wherein the stream-oriented document change event occurs in response to a change in the stream-oriented document;

responsive to detecting the line-oriented document change event, translating line-oriented event text coordinates into stream-oriented text coordinates and determining a complementary document change that is required to update the corresponding stream-oriented document;

implementing the complementary document change in the corresponding stream-oriented document;

responsive to detecting the stream-oriented document change event, translating the stream-oriented event text coordinates into the line-oriented text coordinates and determining the complementary document change that is required to update the line-oriented document; and implementing the complementary document change in the line-oriented document.

2. The computer implemented method of claim 1 further comprising:

registering the line-oriented document event listener API associated with the line-oriented document;

registering the stream-oriented document event listener API associated with the stream-oriented document; and registering a document adjustment listener associated with the line-oriented document.

3. The computer implemented method of claim 1, wherein, the corresponding sequence number area comprises a numeric component and a textual component, and wherein the numeric component is defined by an initial number and an increment related to the position of the text element area in the line-oriented document.

4. The computer implemented method of claim 1 wherein determining the complementary document event in the stream oriented document further comprises:

suspending the stream-oriented document event listener API; and re-registering the stream-oriented document event listener API after the complementary document change is implemented in the stream-oriented document.

5. The computer implemented method of claim 1 wherein determining the complementary document change in the line-oriented document further comprises:

suspending the line-oriented document event listener API; and re-registering the line-oriented document event listener API after the complementary document event is implemented in the line-oriented document.

6. The computer implemented method of claim 5 further comprising detecting, by the document adjustment listener, a document adjustment event, wherein the document adjustment event occurs when there is a change in the line-oriented document.

7. The computer implemented method of claim 6 wherein responsive to detecting a document adjustment event further comprises:

suspending the stream-oriented document event listener API;

translating document adjustment event text coordinates into stream-oriented text coordinates; and implementing the complementary document event in the stream-oriented document.

8. The computer implemented method of claim 7 further comprising determining the complementary document change that is required to update the line-oriented document.

9. A computer program product embodied in a computer readable medium for synchronizing the contents of a line-oriented document and a corresponding stream-oriented document, the computer readable medium comprising:

instructions for loading a line-oriented document and a corresponding stream-oriented document in a memory of a data processing system, wherein the corresponding stream-oriented document is associated with a stream-oriented document event listener API, wherein the line-oriented document is associated with a line-oriented document event listener API, and wherein the line-oriented document comprises records having a text element area and a corresponding sequence number area comprising a line delimiter to indicate an end of a record;

instructions for detecting a line-oriented document change event, wherein the line-oriented document change event occurs in response to a change in the line-oriented document;

instructions for detecting a stream-oriented document change event, wherein the corresponding stream-oriented document change event occurs in response to a change in the stream-oriented document;

responsive to detecting the line-oriented document change event, instructions for translating line-oriented event text coordinates into stream-oriented text coordinates and instructions for determining a complementary document event that is required to update the stream-oriented document;

instructions implementing the complementary document event in the corresponding stream-oriented document;

responsive to detecting the stream-oriented document change event, instructions for translating the stream-oriented event text coordinates into the line-oriented text coordinates and instructions for determining the complementary document event that is required to update the line-oriented document; and instructions for implementing the complementary document event in the line-oriented document.

10. The computer program product of claim 9 further comprising:

instructions for registering the line-oriented document event listener API associated with the line-oriented document;

instructions for registering the stream-oriented document event listener API associated with the stream-oriented document; and instructions for registering an line-oriented document adjustment listener associated with the line-oriented document.

11. The computer program product of claim 9 wherein determining the complementary document event in the stream oriented document further comprises:

instructions for suspending the stream-oriented document event listener API; and instructions for re-registering the stream-oriented document event listener API after the complementary document event is implemented in the stream-oriented document.

12. The computer program product of claim 9 wherein determining the complementary document event in the line-oriented document further comprises:

instructions for suspending the line-oriented document event listener API; and instructions for re-registering the line-oriented document event listener API after the complementary document change is implemented in the line-oriented document.

13. The computer program product of claim 12 further comprising instructions for detecting a document adjustment event, wherein the document adjustment event occurs when there is a change in the line-oriented document.

14. The computer program product of claim 13 further comprising instructions for determining the complementary document change that is required to update the line-oriented document.

15. A data processing system comprising a processor for synchronizing the contents of a line-oriented document and a corresponding stream-oriented document, the data processing system comprising:

loading means for loading a line-oriented document and a corresponding stream-oriented document in a memory of a data processing system, wherein the corresponding stream-oriented document is associated with a stream-oriented document event listener API, wherein the line-oriented document is associated with a line-oriented document event listener API, and wherein the line-oriented document comprises records having a text element area and a corresponding sequence number area including a line delimiter to indicate an end of a record;

detecting means for detecting a line-oriented document change event, wherein the line-oriented document change event occurs in response to a change in the line-oriented document;

detecting means for detecting a stream-oriented document change event, wherein the stream-oriented document change event occurs in response to a change in the stream-oriented document;

responsive to detecting the line-oriented document change event, translating means translating line-oriented event text coordinates into stream-oriented text coordinates and determining means for determining a complementary document event that is required to update the corresponding stream-oriented document;

implementing means for implementing the complementary document event in the corresponding stream-oriented document;

responsive to detecting means detecting the stream-oriented document change event, translating means translating the stream-oriented event text coordinates into the line-oriented text coordinates and determining means for determining the complementary document event that is required to update the line-oriented document; and implementing means for implementing the complementary document event in the line-oriented document.

16. The data processing system of claim 15 wherein determining the complementary document event in the stream oriented document further comprises:

suspending means for suspending the stream-oriented document event listener API; and re-registering means for re-registering the stream-oriented document event listener API after the complementary document event is implemented in the stream-oriented document.

17. The data processing system of claim 15 wherein determining the complementary document event in the line-oriented document further comprises:

suspending means for suspending the line-oriented document event listener API; and re-registering means for re-registering the line-oriented document event listener API after the complementary document event is implemented in the line-oriented document.

18. The data processing system of claim 17 further comprising detecting means for detecting a document adjustment event, wherein the document adjustment event occurs when there is a change in the line-oriented document.

19. The data processing system of claim 18 further comprising determining means for determining the complementary document event that is required to update the line-oriented document.

* * * * *